US012804774B2

(12) United States Patent
Subramanyam et al.

(10) Patent No.: US 12,804,774 B2
(45) Date of Patent: Nov. 17, 2026

(54) DEVICE, SYSTEM AND METHOD FOR BRIDGING COMMUNICATION BETWEEN ENTERPRISE RADIOS AND PUBLIC-SAFETY RADIOS

(71) Applicant: MOTOROLA SOLUTIONS, INC., Chicago, IL (US)

(72) Inventors: Srividya G. Subramanyam, South Barrington, IL (US); Zachariah Dick, Wheaton, IL (US); Lawrence Palmer, Matthews, NC (US); Nolan Cooper, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 210 days.

(21) Appl. No.: 18/976,640

(22) Filed: Dec. 11, 2024

(65) Prior Publication Data

US 2026/0164505 A1 Jun. 11, 2026

(51) Int. Cl.
*H04W 76/50* (2018.01)
*H04W 12/06* (2021.01)
*H04W 72/121* (2023.01)

(52) U.S. Cl.
CPC ........... *H04W 76/50* (2018.02); *H04W 12/06* (2013.01); *H04W 72/121* (2013.01)

(58) Field of Classification Search
CPC .... H04W 76/50; H04W 12/06; H04W 72/121
See application file for complete search history.

(56) References Cited

U.S. PATENT DOCUMENTS

| | | | | |
|---|---|---|---|---|
| 5,471,646 | A | 11/1995 | Schultz | |
| 8,406,684 | B1 * | 3/2013 | Yeh | H04W 76/45 455/3.06 |
| 8,874,159 | B2 | 10/2014 | Shaffer et al. | |
| 8,971,850 | B2 | 3/2015 | Klein et al. | |
| 11,076,277 | B2 | 7/2021 | Tjandra et al. | |
| 2024/0129693 | A1 * | 4/2024 | Lang | H04W 4/12 |
| 2024/0224001 | A1 * | 7/2024 | Ooi | G10L 15/08 |
| 2026/0127548 | A1 * | 5/2026 | Subramanyam | G06Q 10/063 |

* cited by examiner

*Primary Examiner* — Erika A Washington
(74) *Attorney, Agent, or Firm* — PERRY + CURRIER INC. (FOR MSI)

(57) ABSTRACT

Responsive to an incident, a digital hub transmits to a cloud device: an incident group identifier that causes enterprise radios to unmute when received; and an indication of a given frequency in the first frequency band for use in communicating with the enterprise radios and the digital hub. The digital hub receives, from a mobile public-safety base station on the given frequency, a request, that includes the incident group identifier, to communicate with the enterprise radios, and authenticates the mobile public-safety base station using a security token. The digital hub receives, from the mobile public-safety base station, an override command that forces the enterprise radios to communicate via the incident group identifier using the given frequency, and, in response, transmits to the enterprise radios, a command that forces the enterprise radios to communicate with public-safety radios, via the mobile public-safety base station, using the incident group identifier.

20 Claims, 9 Drawing Sheets

DEVICE, SYSTEM AND METHOD FOR BRIDGING COMMUNICATION BETWEEN ENTERPRISE RADIOS AND PUBLIC-SAFETY RADIOS

BACKGROUND OF THE INVENTION

In retail and/or similar enterprise environments, communication is facilitated by enterprise radios (e.g., two-way radios) that may typically operate on an unlicensed 900 MHz band. Such enterprise radios enable internal communication among staff in the retail environment, but are not interoperable with public-safety radios, which may operate on licensed 700/800 MHz, UHF, or VHF bands under public-safety standards, such as Project 25 standards, and the like, for emergency responses.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
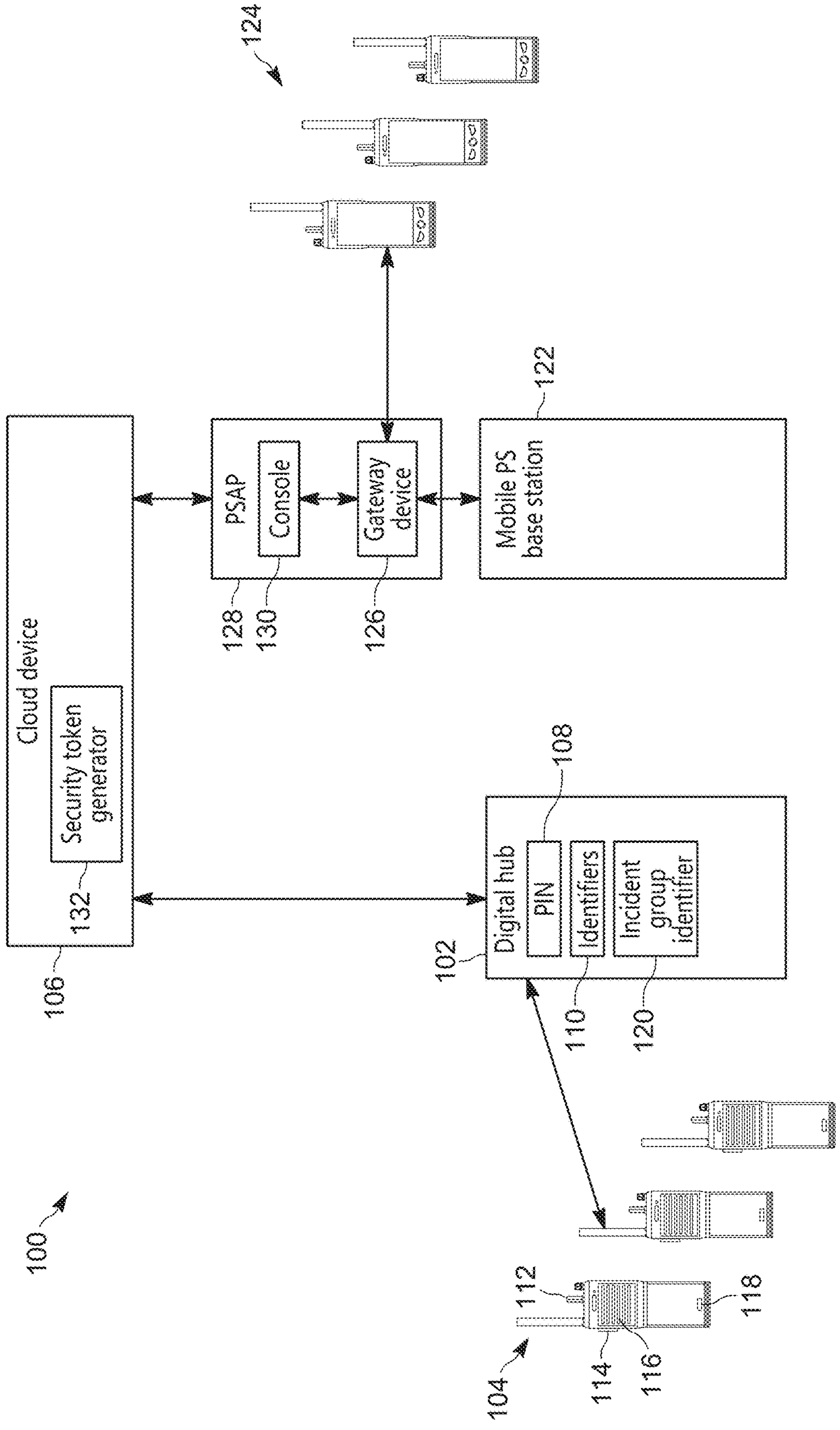
FIG. 1 is a system for bridging communication between enterprise radios and public-safety radios, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In retail and/or similar enterprise environments, communication is facilitated by enterprise radios (e.g., two-way radios) that may typically operate on an unlicensed 900 MHz band. Such enterprise radios enable internal communication among staff in the retail environment, but are not interoperable with public-safety radios, which may operate on licensed 700/800 MHz, UHF, or VHF bands under public-safety standards, such as Project 25 standards, and the like, for emergency responses. This lack of interoperability creates a significant communication gap, as public-safety radios are generally not enabled to communicate using frequencies and protocols used by enterprise radios, and vice versa.

Thus, there exists a need for an improved technical method, device, and system for bridging communication between enterprise radios and public-safety radios.

An aspect of the present specification provides a method comprising: in response to determining, via a digital hub, that an incident has occurred in association with enterprise radios operating within a first frequency band, transmitting, via the digital hub, to a cloud device: an incident group identifier that causes the enterprise radios to unmute when received; and an indication of a given frequency in the first frequency band for use in communicating with the enterprise radios and the digital hub; receiving, via the digital hub, from a mobile public-safety base station on the given frequency, a request to communicate with the enterprise radios, the request including the incident group identifier, the mobile public-safety base station communicatively coupled with the cloud device and public-safety radios operating within a second frequency band; authenticating, via the digital hub, the mobile public-safety base station using a security token; in response to the authenticating, receiving, via the digital hub, from the mobile public-safety base station, an override command that forces the enterprise radios to communicate via the incident group identifier using the given frequency; and in response to receiving the override command, transmitting, via the digital hub, to the enterprise radios, a command that forces the enterprise radios to communicate with public-safety radios, via the mobile public-safety base station, using the incident group identifier.

Another aspect of the present specification provides a digital hub comprising: a controller; and a computer-readable storage medium having stored thereon program instructions that, when executed by the controller, causes the controller to perform a set of operations comprising: in response to determining that an incident has occurred in association with enterprise radios operating within a first frequency band, transmitting, to a cloud device: an incident group identifier that causes the enterprise radios to unmute when received; and an indication of a given frequency in the first frequency band for use in communicating with the enterprise radios and the digital hub; receiving, from a mobile public-safety base station on the given frequency, a request to communicate with the enterprise radios, the request including the incident group identifier, the mobile public-safety base station communicatively coupled with the cloud device and public-safety radios operating within a second frequency band; authenticating the mobile public-safety base station using a security token; in response to the authenticating, receiving, from the mobile public-safety base station, an override command that forces the enterprise radios to communicate via the incident group identifier using the given frequency; and in response to receiving the override command, transmitting, to the enterprise radios, a command that forces the enterprise radios to communicate with public-safety radios, via the mobile public-safety base station, using the incident group identifier.

A further aspect of the present specification provides a system comprising: enterprise radios operating within a first frequency band; public-safety radios operating within a second frequency band; a digital hub associated with the enterprise radios; a mobile public-safety base station associated with the public-safety radios; a gateway device communicatively coupled to the public-safety radios; a cloud device communicatively coupled to: the digital hub; and the mobile public-safety base station via the gateway device; wherein the digital hub is configured to: in response to determining that an incident has occurred in association with the enterprise radios, transmit, to the cloud device, an incident group identifier that causes the enterprise radios to unmute when received; and an indication of a given frequency in the first frequency band for use in communicating with the enterprise radios and the digital hub, wherein the cloud device provides the incident group identifier and the indication of the given frequency to the mobile public-safety base station via the gateway device; receive, from the cloud device, a security token, the cloud device also providing the security token to the mobile public-safety base station via the gateway device; receive, from the mobile public-safety base station on the given frequency, a request to communicate with the enterprise radios, the request including the incident group identifier; authenticate the mobile public-safety base station using the security token; in response to the authenticating, receive from the mobile public-safety base station, an override command that forces the enterprise radios to communicate via the incident group identifier using the given frequency; and in response to receiving the override command, transmit, to the enterprise radios, a command that forces the enterprise radios to communicate with public-safety radios, via the mobile public-safety base station, using the incident group identifier; and wherein the mobile public-safety base station is configured to: after the authenticating, function as a bridge between the enterprise radios and the public-safety radios, such that the mobile public-safety base station converts respective audio from the enterprise radios and the public-safety radios between the given frequency and the second frequency band.

Each of the above-mentioned embodiments will be discussed in more detail below, starting with example system and device architectures of the system in which the embodiments may be practiced, followed by an illustration of processing blocks for bridging communication between enterprise radios and public-safety radios.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, reference will be made to engines, which may be understood to refer to hardware, and/or a combination of hardware and software (e.g., a combination of hardware and software includes software hosted at hardware such that the software, when executed by the hardware, transforms the hardware into a special purpose hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 for bridging communication between enterprise radios and public-safety radios. The various components of the system 100 are in communication via any suitable combination of wired and/or wireless communication links. Communication links between components of the system 100 are depicted in FIG. 1, and throughout the present specification, as double-ended arrows between respective components; the communication links may include any suitable combination of wireless and/or wired links and/or wireless and/or wired communication networks, and the like unless specifically indicted.

The system 100 comprises a digital hub 102 and a plurality of mobile enterprise radios 104, that are generally configured to operate within a first frequency band, that may include, but is not limited to, a 900 MHz frequency band, which is generally unlicensed. Such an unlicensed frequency band may be used to by certain types of enterprise and/or consumer radios, that may otherwise be restricted from using licensed frequency bands (e.g., licensed for use by public-safety radios, and/or consumer cell phones, and/or media entities, and the like). While the enterprise radios 104 are generally described herein as being mobile, a subset of the enterprise radios 104 may be fixed and/or not mobile.

In particular, the enterprise radios 104 may comprise two-way radios that are generally configured to wirelessly broadcast audio, and receive wireless broadcasts of audio from other two-way radios (e.g., without using control channels, and/or trunking and the like, that are used by public-safety radios, as described herein). Indeed, such two-way radios may comprise walkie-talkies, and/or may be untrunked. Hence, while communication links are not depicted between the enterprise radios 104 for simplicity, it is understood that the enterprise radios 104 may be wirelessly communicatively coupled with each other, as well as the digital hub 102. Indeed, as depicted, one wireless communication link is depicted between the enterprise radios 104 and the digital hub 102, which may represent a communication network formed by the enterprise radios 104 and the digital hub 102 that operates on the first frequency band.

It is further understood that the enterprise radios 104 may exclude consumer cell phones, which use licensed frequency bands and/or control channels. In one non-limiting example, the enterprise radios 104 may comprise Curve™ radios from Motorola Solutions Incorporated, though any suitable type of enterprise radio is within the scope of the present specification.

In particular, the enterprise radios 104 and the digital hub 102 may be deployed in an enterprise environment, such as a retail store, and the like, such as a department store, and/or any store having different departments, and the like, though the enterprise radios 104 and the digital hub 102 may be deployed in any suitable environment including, but not limited to, schools, colleges, malls, convention centers, and the like. Put another way, while the term "enterprise" is used to describe the enterprise radios 104, the term is not meant to limit the enterprise radios 104 for use solely in enterprise environments in all embodiments, and the enterprise radios 104 and the digital hub 102 may be deployed anywhere that two-way radios, and the like, may be useful.

The digital hub 102 may comprise a radio device configured to wirelessly communicate with the enterprise radios 104 on the first frequency band (e.g., the digital hub 102 may also comprise a two-way radio), and may further be communicatively coupled to a cloud device 106 using, for example, an internet-based communication link, such as a Wi-Fi-based or wired communication link, and the like, and the cloud device 106 may generate and/or provide usage analytics, and the like. Put another way, the digital hub 102 may monitor communications between the enterprise radios 104, gather usage statistics (e.g., how often a particular virtual channel was used, described below), and provide the usage statistics to the cloud device 106, which may analyze the usage statistics.

The digital hub 102 may perform other suitable functions, such as extended range connectivity (e.g., rebroadcast audio from the enterprise radios 104 over a range larger than a range of an individual enterprise radio 104), set up the enterprise radios 104 with information required to communicate therebetween, and the like.

Indeed, it is understood that the enterprise radios 104 may have a maximum broadcast range that may be up to 75 meters, up to 100 meters, up to 125 meters, amongst other possibilities, though the broadcast range may depend on a structure and/or layout of a building within which the enterprise radios 104 are operating.

In one example, the digital hub 102 may comprise a Motorola DH300, also known as a Curve Digital Hub, from Motorola Systems Inc., though any suitable type of digital hub is within the scope of the present specification The enterprise radios 104 and the digital hub 102 may communicate therebetween, as is next described with respect to particular data that is depicted as stored at the digital hub 102, though it is understood that such data is generally also stored at enterprise radios 104. For example, as depicted, the digital hub 102 and the enterprise radios 104 store an indication 108 of a given frequency in the first frequency band for use in communicating with the enterprise radios 104 and the digital hub 102, and, as depicted, the indication 108 may be provided in the form of a profile identifier (PIN), which may comprise an alphanumeric code that indicates to the enterprise radios 104 and the digital hub 102 a frequency on which to communicate. For clarity, hereafter the indication 108 will be interchangeably referred to as the PIN 108, though the indication 108 may be different from a PIN.

For example, when the enterprise radios 104 and the digital hub 102 are configured to communicate in a 900 MHz frequency band, the PIN 108 may indicate an offset frequency from 900 MHz that is used by all the enterprise radios 104 and the digital hub 102. In a particular example, the PIN 108 may indicate a positive offset of 1.6 MHz from 900 MHz, such that the enterprise radios 104 and the digital hub 102 communicate at 901.6 MHz (e.g., 900 MHz plus 1.6 MHz). Indeed, different environments where other instances of similar enterprise radios and an associated digital hub may be deployed may be provided with a different indication (e.g., see FIG. 9), such that the different instances of the similar enterprise radios and an associated digital hub communicate on a different frequency than the enterprise radios 104 and the digital hub 102.

Indeed, to further avoid interference, and/or to obviate others from broadcasting to the enterprise radios 104 and the digital hub 102, the PIN 108, or another suitable indicator, may be provided in metadata of broadcast audio, and the enterprise radios 104, and the digital hub 102 may not unmute to play the broadcast audio unless the PIN 108, or another suitable indicator, is present in the metadata. Put another way, the PIN 108, or another suitable indicator, be used as metadata to identify the network formed by the enterprise radios 104 and the digital hub 102.

Indeed, such configurations (e.g., use of PINs and any other suitable indicator in metadata), may further prevent other types of devices that may be using a 900 MHz band to communicate (e.g., such devices used in the utilities industry) from listening in on broadcasts of the enterprise radios 104.

Furthermore, the digital hub 102 and the enterprise radios 104 may further store a list of identifiers 110, which may comprise alphanumeric identifiers of different "virtual" channels used by the enterprise radios 104 and the digital hub 102 to communicate. For example, in a retail environment, such as a department store, the identifiers 110 may correspond to different departments such as "Shoes", "Jewelry", "Clothing", and the like. As also seen in FIG. 1, and indicated at one enterprise radio 104 for simplicity, the enterprise radios 104 comprise respective knobs 112, and the like, that may be manually operated to select a specific channel.

Alternatively, or in addition, one or more of the identifiers 110 may be used as metadata to identify the network formed by the enterprise radios 104 and the digital hub 102.

It is further understood that, in addition to a knob 112, the enterprise radios 104 may comprise any suitable combination of buttons, speakers, microphones, and the like for implementing functionality thereof. For example, as indicated at one enterprise radio 104, an enterprise radio 104 may further comprise a button 114, a speaker 116 and a microphone 118. It is further understood that the speakers 116 are generally muted, and are unmuted when broadcast audio is received on a frequency indicated by the PIN 108 and that includes an identifier 110 that identifies a channel matching a channel selected using a respective knob 112, as is next described.

For example, at a particular enterprise radio 104, when the button 114 is pressed and held, a user may speak into the microphone 118 and broadcast audio to the other enterprise radios 104, with metadata including an identifier 110 corresponding to a channel selected using the knob 112, on the frequency indicated by the PIN 108. When other enterprise radios 104 receive the broadcast audio on the frequency indicated by the PIN 108, and their respective knobs 112 are set to the same channel indicated by the identifier 110 in the metadata, the other enterprise radios 104 unmute their respective speakers 116 to play the broadcast audio. However, when the other enterprise radios 104 receive the broadcast audio, on the frequency indicated by the PIN 108, and their respective knobs 112 are not set to the same channel indicated by the identifier 110 in the metadata, the other enterprise radios 104 leave their respective speakers 116 muted.

For example, when a knob 112 of an enterprise radio 104 is set to a channel of "Shoes", when the enterprise radio 104 is used to broadcast audio to the other enterprise radios 104 on the frequency indicated by the PIN 108, the identifier 110 of "Shoes" is added to metadata of the broadcast audio, and only other enterprise radios 104 that are also set to a channel of "Shoes" may unmute their respective speakers 116 to play the broadcast audio. The digital hub 102 may function in a similar manner, and hence may also comprise a knob, and like, to select a channel. However, in other examples, the digital hub 102 may play all audio received (or play none of the audio received).

Indeed, in this manner, the enterprise radios 104 and the digital hub 102 may broadcast on a same frequency (e.g., 901.6 MHz) for all the channels, but only unmute to play broadcast audio when the broadcast audio includes an identifier 110 of a channel selected via a respective knob 112, and the like (e.g., and, in some examples, the PIN 108, and the like). As such the channels indicated by the identifiers 110 may be referred to as "virtual" channels as the frequency of such channels is typically the same.

As also depicted in FIG. 1, the enterprise radios 104 and the digital hub 102 may further store an incident group identifier 120 that may be similar to the identifiers 110, but may comprise an alphanumeric identifier (e.g., such as "Incident") that may be used as metadata in broadcast audio that occurs during incidents, and is described in further detail herein.

As depicted, the system 100 further comprises a mobile public-safety base station 122 wirelessly communicatively coupled to (e.g., mobile) public-safety radios 124, for example via a gateway device 126, that may be a component of a public-safety answering point (PSAP) 128. While the public-safety radios 124 are generally described herein as being mobile, a subset of the public-safety radios 124 may be fixed and/or not mobile.

As depicted, the PSAP 128 may further comprise a console device 130 communicatively coupled to the gateway device 126. Furthermore, as depicted, the cloud device 106 may be communicatively coupled to the mobile public-safety base station 122 via the PSAP 128 and/or the gateway device 126.

The public-safety radios 124 may generally comprise radios used by public-safety officers and/or first responders, that communicate via a second frequency band different from the first frequency band used by the enterprise radios 104 and the digital hub 102. The second frequency band generally comprises a licensed frequency band dedicated for use by public-safety officers and/or first responders, and may may comprise one or more of a 700/800 MHz frequency band, a UHF (Ultra High Frequency) frequency band, and a VHF (Very High Frequency) frequency band. Furthermore, the public-safety radios 124 may communicate using any suitable public-safety communication protocol, such as P25 (Project 25) protocols, DMR (digital mobile radio) protocols, TETRA (terrestrial trunked radio) protocols, and the like. In general, the public-safety radios 124 may operate using a control channel, and/or using trunking, and/or using talkgroups, and the like. In particular, talkgroups may comprise virtual communication channels within a radio system (e.g., formed by the public-safety radios 124, the gateway device 126 and the mobile public-safety base station 122, and the like), that allow specific groups of radios to communicate with each other without broadcasting to all the radios.

In some examples, the public-safety radios 124 may comprise Astro™ P25 radios from Motorola Systems Incorporated, and/or trunked radios, though any suitable public-safety radios are within the scope of the present specification.

Regardless, it is understood that the public-safety radios 124 generally operate on a different frequency band, and using different protocols, as the enterprise radios 104. As will be described herein, the mobile public-safety base station 122 may be enabled as a communication bridge between the enterprise radios 104 and the public-safety radios 124, though, initially, as depicted in FIG. 1 there may not yet necessarily be a communication link therebetween.

Indeed, the mobile public-safety base station 122 may operate on the same second frequency band as the public-safety radios 124, and according to a same protocol, but is understood to be further enabled to communicate on the same first frequency band as the enterprise radios 104. In particular, the mobile public-safety base station 122 may comprise an in-dash radio of a vehicle deployed to an incident that is occurring at the location of the enterprise radios 104 and the digital hub 102.

In some examples, the mobile public-safety base station 122 may comprise an APX™ 8500 All-Band P 25 Mobile from Motorola Systems Incorporated, though any suitable mobile public-safety base station is within the scope of the present specification.

The gateway device 126 may comprise a conventional channel gateway device (CCGW) from Motorola System Incorporated, though any suitable gateway device is within the scope of the present specification. The gateway device 126 may communicatively couple the console device 130 and the public-safety radios 124. The gateway device 126 may further communicatively couple the mobile public-safety base station 122 and the public-safety radios 124.

It is understood that while the mobile public-safety base station 122 may be generally capable of a wired connection to the gateway device 126 (e.g., for the combination of the APX™ 8500 All-Band P 25 Mobile and the CCGW, via wireline for control data and an RS232 connection for audio flow), in general, when deployed to an incident location, the mobile public-safety base station 122 and the gateway device 126 may be in communication via a wireless communication link.

The gateway device 126 may further communicatively couple the mobile public-safety base station 122 and the console device 130. For example, the console device 130 may comprise a dispatch console, such as the MCC 7500C™ from Motorola Solutions Incorporated, though any suitable console device is within the scope of the present specification. While not all components of the console device 130 are depicted, it is understood that the console device 130 may comprise any suitable combination of input devices and output devices that may enable a dispatcher to operate and/or interact with the console device 130 (e.g., a microphones, a speaker, a headset, a display screen, a keyboard, a pointing device, and the like).

In general, the gateway device 126 may enable the console device 130 to operate as a trunked radio device, similar to the public-safety radios 124. While not depicted, the gateway device 126 may be communicatively coupled to a plurality of console devices 130 and provide respective communication functionality with the public-safety radios 124 and the mobile public-safety base station 122 for the plurality of console devices 130, as described herein.

Furthermore, it is understood that the mobile public-safety base station 122 and the public-safety radios 124 may communicate in any suitable manner, and, similarly, the cloud device 106 and the mobile public-safety base station 122 may communicate in any suitable manner.

As will be described herein with respect to FIG. 3 to FIG. 9, the mobile public-safety base station 122 may act as a communication bridge between the enterprise radios 104 and the public-safety radios 124. For example, when an incident occurs at the location of the enterprise radios 104 and the digital hub 102, one or more of the enterprise radios 104 and/or the digital hub 102 may be operated to indicate that an incident has occurred in association with the enterprise radios 104 and/or the location of the enterprise radios 104 and the digital hub 102. For example, while not depicted one or more of the enterprise radios 104 and/or the digital hub 102 may include a suitable input device that may be operated to indicate that such an incident has occurred.

In these examples, when a suitable input device is actuated at an enterprise radio 104, an indication of an incident may be broadcast to the digital hub 102, and the other enterprise radios 104. When the digital hub 102 receives the indication, the digital hub 102 may determine that an incident has occurred in association with the enterprise radios 104, and the like. Alternatively, or in addition, when such an input device is actuated at the digital hub 102, the digital hub 102 may determine that an incident has occurred in association with the enterprise radios 104, and the like.

Alternatively, or in addition, a respective button 114 may be actuated in a manner that indicates an incident (e.g., a given sequence of actuations of a respective button 114, such as rapidly pressing the button 114 three times, may indicate an incident at an enterprise radio 104), and a respective enterprise radio 104 may responsively broadcast an incident indication to the digital hub 102.

Alternatively, or in addition, an enterprise radio 104 may receive voice data at a respective microphone 118 that indicates an incident (e.g., a user may say "Emergency", or "Incident" and/or indicate a specific incident type (e.g., police incident, fire incident, medical incident) and voice activation may be used to indicate an incident), and the enterprise radio 104 may responsively broadcast an incident indication to the digital hub 102.

Alternatively, or an addition, an alarm sensor (e.g., such as a smoke detector, a gunshot detector, and the like, amongst other possibilities) and/or an alarm button (e.g., such as a pull station, a panic button, a duress alarm, and the like, amongst other possibilities, not depicted) may be communicatively coupled to the digital hub 102 (e.g., via a wireline communication link and/or a wireless communication link similar to the enterprise radios 104), and when an incident is sensed by such a sensor, or such a button is actuated, an incident indication may be provided to the digital hub 102.

Indeed, any suitable combination of one or more of input data and/or sensed data at one or more devices at the location of the enterprise radios 104, and the like, may cause one or more indications of an incident to be provided to the digital hub 102.

In response to a determination of such an incident, the digital hub 102 transmits, to the cloud device 106: the incident group identifier 120; and the PIN 108 of the given frequency in the first frequency band for use in communicating with the enterprise radios 104 and the digital hub 102.

The digital hub 102 and/or the cloud device 106 may be further configured to determine which PSAP to communicate with regarding an incident occurring at a location of the enterprise environment (e.g., retail store) where the enterprise radios 104 and the digital hub 102 are deployed. For example, the digital hub 102 and/or the cloud device 106 may be preconfigured to communicate with components of the PSAP 128 when incidents occur at the location. In particular, a network address of the PSAP 128 (and network addresses of other PSAPs) may be preconfigured at the digital hub 102 and/or the cloud device 106 accordingly.

Alternatively, or in addition, the cloud device 106 may be configured to select the PSAP 128 based on the location. For example, the location may be in jurisdiction of a public-safety agency that operates the PSAP 128, and the like, and such a location may be preconfigured at the cloud device 106 and/or received from the digital hub 102.

Alternatively, or in addition, the digital hub 102 and/or the cloud device 106 may be configured to select the PSAP 128 based on a type of the incident. For example, the incident may be a police incident, a firefighter incident, a medical incident, and different PSAPs of the system 100 may be operated by a police agency, a fire agency or a medical agency (e.g., an emergency medical technician and/or ambulance agency). Hence, when the incident is a police incident, a PSAP associated with a police agency is selected; similarly, when the incident is a fire incident, a PSAP associated with a firefighter agency is selected; and, similarly, when the incident is a medical incident, a PSAP associated with a medical agency is selected. Hence, in these examples, it is understood that the PSAP 128 may be associated with an agency associated with a type of the incident.

The cloud device 106 transmits the incident group identifier 120 and the PIN 108 to the mobile public-safety base station 122, via the gateway device 126, and/or any other information and/or indicators that may be required to communicate with the digital hub 102 and the enterprise radios 104. Such communication with the mobile public-safety base station 122 may occur in the second frequency range, at least between the gateway device 126 and the mobile public-safety base station 122.

Furthermore, a vehicle carrying the mobile public-safety base station 122 may have been dispatched to the location of the enterprise radios 104 and the digital hub 102, such that the mobile public-safety base station 122 is within a communication range of the enterprise radios 104, for example, when the vehicle carrying the mobile public-safety base station 122 parks outside the location of the enterprise radios 104 and the digital hub 102.

Having received the incident group identifier 120 and the PIN 108 (e.g., and any other suitable information), the mobile public-safety base station 122 may broadcast on the frequency indicated by the PIN 108 to communicate with the digital hub 102. In particular, the mobile public-safety base station 122 may broadcast the incident group identifier 120 (e.g., include the incident group identifier 120, and the like, in the metadata thereof), which is received at the digital hub 102. The mobile public-safety base station 122 may further broadcast the incident group identifier 120 with a request to communicate with the digital hub 102, though the broadcast of the incident group identifier 120 may, itself, function as such a request.

For security purposes, the digital hub 102 may authenticate the mobile public-safety base station 122 using a security token, which may be generated by the digital hub 102, the cloud device 106, the mobile public-safety base station 122, and/or a component of the PSAP 128.

When the security token is generated by the digital hub 102, the digital hub 102 may provide a copy of the security token to the cloud device 106 with the incident group identifier 120 and the PIN 108, which provides the copy of the security token to the mobile public-safety base station 122 with the incident group identifier 120 and the PIN 108.

When the security token is generated by the cloud device 106, the cloud device 106 provides a copy of the security token to the digital hub 102 in response to receiving the incident group identifier 120 and the PIN 108, and the cloud device 106 further provides the copy of the security token to the mobile public-safety base station 122 with the incident group identifier 120 and the PIN 108.

When the security token is generated by the mobile public-safety base station 122, or a component of the PSAP 128, the mobile public-safety base station 122, or a component of the PSAP 128, a copy of the security token is provided to the cloud device 106 by the security token generating device (e.g., via the PSAP 128) in response to receiving the incident group identifier 120 and the PIN 108. In these examples, the cloud device 106 further provides the copy of the security token to digital hub 102. When the security token is generated by the component of the PSAP 128, the component of the PSAP 128 further provides a copy of the security token to the mobile public-safety base station 122 with the incident group identifier 120 and the PIN 108.

Hence, while herein examples will be described with respect to the cloud device 106 generating the security token, for example via a security token generator 132 at the cloud device 106, it is understood that a security token may be generated, and distributed, by any suitable device of the system 100.

Regardless, it is understood that both the digital hub 102 and the mobile public-safety base station 122 have stored a security token and/or copies thereof. Such a security token and/or copies thereof, may comprise any suitable security token and/or complementary security tokens, that may be used to authenticate devices, and may include, but are not limited to, AES (Advanced Encryption Standard) encryption keys, any suitable set of symmetric keys, any suitable set of asymmetric keys, and the like.

Hence, the digital hub 102 may authenticate the mobile public-safety base station 122 by transmitting, to the mobile public-safety base station 122, a token challenge (e.g., a request for a security token), which may result in the mobile public-safety base station 122 transmitting back to the digital hub 102 a copy of the security token for comparison with the security token stored at the digital hub 102. When the copy of the security token and the security token match, the digital hub 102 may consider the mobile public-safety base station 122 to be authenticated, and transmit an indication of successful authentication to the mobile public-safety base station 122.

Alternatively, or in addition, the mobile public-safety base station 122 may transmit, back to the digital hub 102, data (e.g., such as the incident group identifier 120) encrypted using the security token or a copy thereof, and the like (that may include, but is not limited to a complementary encryption key), and the digital hub 102 may decrypt the data. When the decrypted data corresponds to data recognized by the digital hub 102 (e.g., such as the incident group identifier 120), the digital hub 102 may consider the mobile public-safety base station 122 to be authenticated, and transmit an indication of successful authentication to the mobile public-safety base station 122.

However, the authentication may occur in any suitable manner.

In response to the authenticating, the mobile public-safety base station 122 may transmit, to the digital hub 102, an override command that forces the enterprise radios 104 to communicate via the incident group identifier 120 using a given frequency indicated by the PIN 108.

In response to receiving the override command, the digital hub 102 may transmit to the enterprise radios 104, a command that forces the enterprise radios 104 to communicate with public-safety radios 124, via the mobile public-safety base station 122, using the incident group identifier 120. For example, upon receiving the command, the enterprise radios 104 will unmute upon receiving broadcast audio that includes the incident group identifier 120 as metadata. Furthermore when the enterprise radios 104 transmit broadcast audio, such broadcast audio is broadcast with the incident group identifier 120 as metadata, regardless of a setting of the knob 112.

In particular, after the authenticating, the mobile public-safety base station 122 functions as a bridge between the enterprise radios 104 and the public-safety radios 124, such that the mobile public-safety base station 122 converts respective audio from the enterprise radios 104 and the public-safety radios 124 between the given frequency and the second frequency band.

Furthermore, when the mobile public-safety base station 122 receives audio from a public-safety radio 124 on the second frequency band, the mobile public-safety base station 122 generally broadcasts the audio to the enterprise radios 104 on the first frequency band with the incident group identifier 120 as metadata.

Conversely, when the mobile public-safety base station 122 receives audio from an enterprise radio 104 on the first frequency band with the incident group identifier 120 as metadata, the mobile public-safety base station 122 generally transmits the audio on the second frequency band to the public-safety radios 124 (in some embodiments, without the incident group identifier 120).

It is further understood that the public-safety radios 124 that participate in these communications may be communicating on a particular talkgroup that has been designated for use with the incident occurring in association with the enterprise radios 104, and which may be assigned via the PSAP 128 and/or the console device 130. Alternatively, or in addition, a subset of the public-safety radios 124 may be assigned to the incident via any suitable combination of dispatch commands, and the like. Put another way, the mobile public-safety base station 122 may receive an indication of the particular talkgroup that has been designated for use with the incident, and, in response, use the particular talkgroup when bridging communications between the enterprise radios 104 and the public-safety radios 124.

It is further understood that when the mobile public-safety base station 122 is acting as a communication bridge, the digital hub 102 may also participate in the communications, similar to the enterprise radios 104, but does not otherwise participate in communication bridging between the enterprise radios 104 and the public-safety radios 124.

Figure 2:
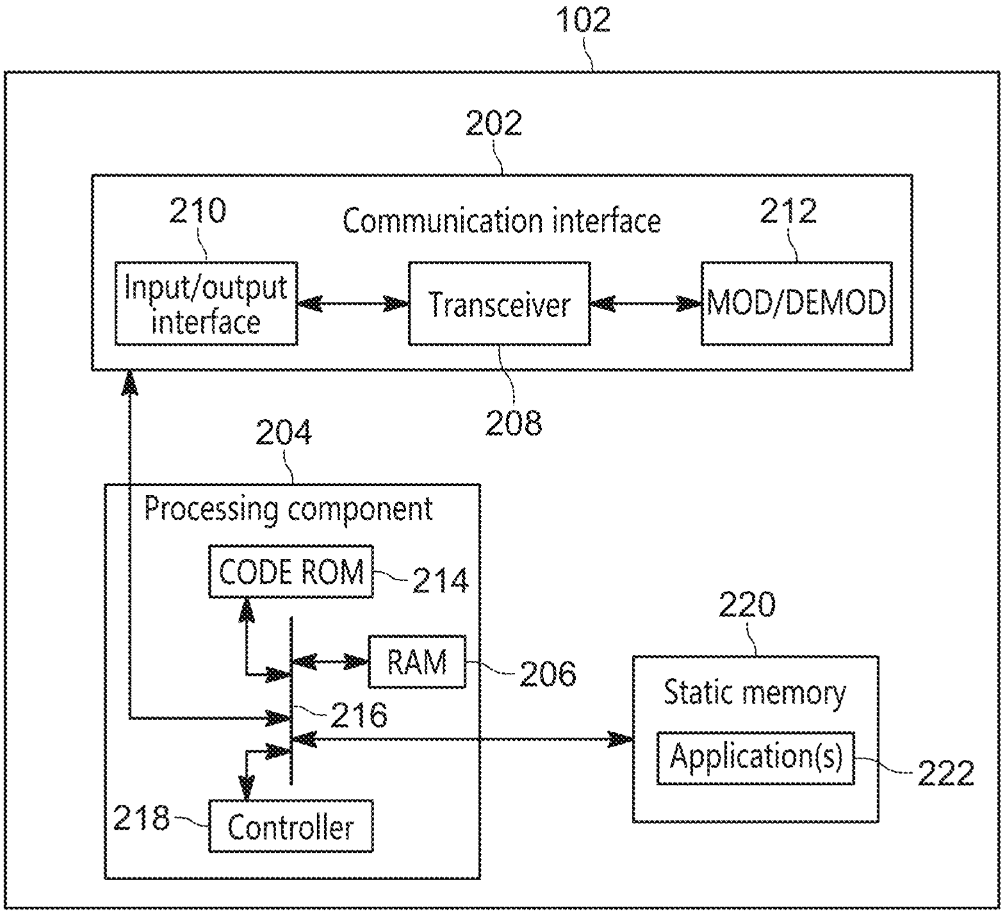
FIG. 2 is a device diagram showing a device structure of a computing device for bridging communication between enterprise radios and public-safety radios, in accordance with some examples.

Attention is next directed to FIG. 2, which depicts a schematic block diagram of an example of the digital hub 102. While the digital hub 102 is depicted in FIG. 2 as a single component, the digital hub 102 may be distributed among a plurality of components and the like including, but not limited to, any suitable combination of one or more digital hubs, and the like.

As depicted, the digital hub 102 comprises: a communication interface 202, a processing unit 204, a Random-Access Memory (RAM) 206, two or more transceivers 208 (e.g., one transceiver 208 for the first frequency range and another transceiver 208 for the second frequency range), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the digital hub 102 may have any suitable structure and/or configuration.

While not depicted, the memory 220 may further store the indication 108 (e.g., the PIN 108), the identifiers 110 and/or the incident group identifier 120, for example as components of the application 222.

While also not depicted, the digital hub 102 may include, and/or be in communication with, one or more of a display screen and an input component (and/or any other suitable combination of input and/or output components).

As shown in FIG. 2, the digital hub 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include two or more transceivers 208 for communicating with other suitable components of the system 100 as described herein. Hence, the two or more wireless transceivers 208 may be adapted for communication with one or more communication links and/or communication networks used to communicate with the enterprise radios 104 and the mobile public-safety base station 122, as well as the console device 130. For example, the two or more transceivers 208 may be adapted for communication with one or more of a short range radio network operating on an unlicensed frequency band (e.g., that may include, but is not limited to, a 900 MHz frequency band), the Internet, a Bluetooth network, a Wi-Fi network, for example operating in accordance with an IEEE 802.11 standard (e.g., 802.11a, 802.11b, 802.11g), a Worldwide Interoperability for Microwave Access (WiMAX) network, for example operating in accordance with an IEEE 802.16 standard, and/or another similar type of wireless network.

Hence, the two or more transceivers 208 may include, but are not limited to, a short range radio transceiver (e.g., that may be configured to operate on an unlicensed frequency band that may include, but is not limited to, a 900 MHz frequency band), a Bluetooth transceiver, a Wi-Fi transceiver, a WiMAX transceiver, and/or another similar type of wireless transceiver.

However, in some examples, the two or more transceivers 208 may be combined into one dual-band or multi-band transceiver configured to communicate on the first frequency range and the second frequency range.

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the digital hub 102 is not a generic controller and/or a generic device, but a device specifically configured to implement functionality for causing bridging communication between enterprise radios and public-safety radios. For example, in some examples, the digital hub 102 and/or the controller 218 specifically comprises a computer executable engine configured to implement functionality for causing bridging communication between enterprise radios and public-safety radios.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the digital hub 102 as described herein are maintained, persistently, at the memory 220 and used by the controller 218, which makes appropriate utilization of volatile storage during the execution of such programming instructions.

Regardless, it is understood that the memory 220 stores instructions corresponding to the at least one application 222 that, when executed by the controller 218, enables the controller 218 to implement functionality particular to the digital hub 102. For example, the memory 220 stores instructions corresponding to the at least one application 222 that, when executed by the controller 218, enables the controller 218 to implement functionality, including, but not limited to, blocks of the process set forth in FIG. 3.

While structure of other components of the system 100 (such as components 106, 112, 122, 124, 126, and 130) are not specifically or separately described in the figures, they may have a same or similar structure as depicted in FIG. 2, but adapted for the functionality of those components.

For example, the mobile public-safety base station 122 may have a similar structure as depicted in FIG. 2, but transceivers thereof may be adapted for communication with one or more of a short range radio network operating on an unlicensed frequency band (e.g., that may include, but is not limited to, a 900 MHz frequency band), the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the transceivers 208 may include, but are not limited to, a short range radio transceiver (e.g., that may be configured to operate on an unlicensed frequency band that may include, but is not limited to, a 900 MHz frequency band), a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

Put another way, the transceivers 208 of the mobile public-safety base station 122 generally enable communication with both the enterprise radios 104 (e.g., and the digital hub 102), and the public-safety radios 124 (e.g., and the gateway device 126).

Similarly, the transceivers 208 of the enterprise radios 104 may comprise short range radio transceivers (e.g., that may be configured to operate on an unlicensed frequency band that may include, but is not limited to, a 900 MHz frequency band), and omit at least P25, TETRA and DMR transceivers, which may be particular to the public-safety radios 124 (and/or public-safety radios in general).

Similarly, the transceivers 208 of the public-safety radios 124 may comprise P25, TETRA and/or DMR transceivers, but omit at least short range radio transceivers (e.g., that may be configured to operate on an unlicensed frequency band that may include, but is not limited to, a 900 MHz frequency band), that may be particular to the enterprise radios 104.

The gateway device 126 may have a similar configuration as the public-safety radios 124, and also be configured to communicate with the console device 130 using, for example, the Internet, and/or communication systems and/or networks internal to the PSAP 128.

The console device 130 is similarly configured to communicate with the gateway device 126, as well as the cloud device 106 via, for example, the Internet.

The cloud device 106 is similarly configured to communicate with the digital hub 102, the console device 130, and/or other components of the PSAP 128, via, for example, the Internet. The cloud device 106 may comprise any suitable combination of one or more servers, one more cloud computing devices, and the like, and may be provided as a single enclosure, or distributed among a plurality of enclosures.

Figure 3:
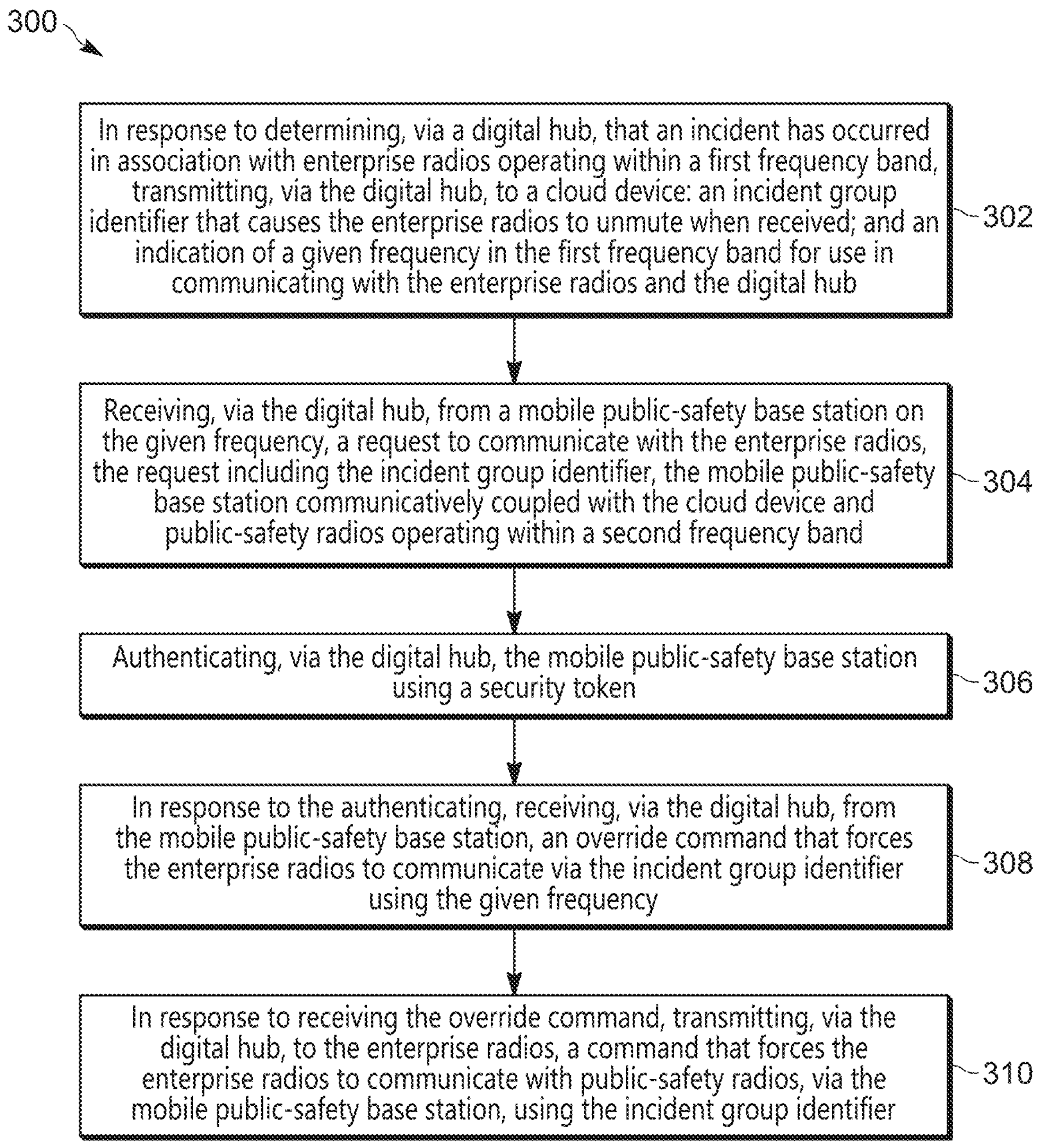
FIG. 3 is a flowchart of a process for bridging communication between enterprise radios and public-safety radios, in accordance with some examples.

Attention is next directed to FIG. 3, which depicts a process for bridging communication between enterprise radios and public-safety radios. The operations of the process 300 of FIG. 3 correspond to machine readable instructions that are executed by the controller 218 and/or the digital hub 102. In the illustrated example, the instructions represented by the blocks of FIG. 3 are stored at the memory 220 for example, as the application 222. The process 300 of FIG. 3 is one way in which the controller 218 and/or digital hub 102 and/or the system 100 may be configured. Furthermore, the following discussion of the process 300 of FIG. 3 will lead to a further understanding of the system 100, and its various components.

The process 300 of FIG. 3 need not be performed in the exact sequence as shown and likewise various blocks may be performed in parallel rather than in sequence. Accordingly, the elements of process 300 are referred to herein as "blocks" rather than "steps". The process 300 of FIG. 3 may be implemented on variations of the system 100 of FIG. 1, as well.

At a block 302, the controller 218, and/or the digital hub 102, in response to determining that an incident has occurred in association with enterprise radios 104 operating within a first frequency band, transmits, to a cloud device 106: an incident group identifier 120 that causes the enterprise radios 104 to unmute when received; and an indication 108 (e.g., the PIN 108) of a given frequency in the first frequency band for use in communicating with the enterprise radios 104 and the digital hub 102.

At a block 304, the controller 218, and/or the digital hub 102, receives, from a mobile public-safety base station 122 on the given frequency, a request to communicate with the enterprise radios 104, the request including the incident group identifier 120, the mobile public-safety base station 122 communicatively coupled with the cloud device 106 and public-safety radios 124 operating within a second frequency band.

At a block 306, the controller 218, and/or the digital hub 102, authenticates the mobile public-safety base station 122 using a security token.

The authenticating at the block 306 may comprise, the controller 218, and/or the digital hub: determining the security token; transmitting to the mobile public-safety base station 122, a token challenge; in response to the token challenge, receiving, from the mobile public-safety base station 122, a respective security token, and the like); and authenticating, via the digital hub, the mobile public-safety base station 122 when the security token and the respective security token are same or associated.

Furthermore, determining the security token may comprise one of: receiving, via the digital hub 102, from the cloud device 106, the security token; or generating, via the digital hub 102, the security token; and providing a copy of the security token to the cloud device 106, such that the cloud device 106 provides the copy of the security token to the mobile public-safety base station 122 as the respective security token.

At a block 308, the controller 218, and/or the digital hub 102, in response to the authenticating, receives, from the mobile public-safety base station 122, an override command that forces the enterprise radios 104 to communicate via the incident group identifier 120 using the given frequency.

At a block 310, the controller 218, and/or the digital hub 102, in response to receiving the override command, transmits to the enterprise radios 104, a command that forces the enterprise radios 104 to communicate with public-safety radios 124, via the mobile public-safety base station 122, using the incident group identifier 120.

In general, after the authenticating at the block 306, the mobile public-safety base station 122 functions as a bridge between the enterprise radios 104 and the public-safety radios 124, such that the mobile public-safety base station 122 converts respective audio from the enterprise radios 104 and the public-safety radios 124 between the given frequency and the second frequency band.

Furthermore, after the authenticating at the block 306: first audio from the enterprise radios 104, received at the mobile public-safety base station 122 on the given frequency, is transmitted, by the mobile public-safety base station 122, to the public-safety radios 124 on a respective frequency in the second frequency band. Conversely, after the authenticating at the block 306, second audio from the public-safety radios 124 received at the mobile public-safety base station 122 is transmitted, by the mobile public-safety base station 122, to the enterprise radios 104 on the given frequency with the incident group identifier 120.

The process 300 may comprise other features and/or steps, which may be performed by the mobile public-safety base station 122 after the authenticating of the block 306, and/or in particular when the mobile public-safety base station 122 is in communication with the public-safety radios 124 via the gateway device 126.

For example, the process 300 may further comprise: receiving, by the mobile public-safety base station 122, from one of the enterprise radios 104, first audio on the given frequency with the incident group identifier 120; and causing, by the mobile public-safety base station 122, the first audio to be broadcast, via the gateway device 126, to the public-safety radios 124 on the second frequency band. Such broadcasting may occur on a talkgroup used by the public-safety radios 124 for the incident.

Similarly, the process 300 may further comprise: receiving, by the mobile public-safety base station 122, via the gateway device 126, from one of the public-safety radios 124, second audio (e.g., on the talkgroup used by the public-safety radios 124 for the incident); and causing, by the mobile public-safety base station 122, the second audio to be broadcast to the enterprise radios 104 on the given frequency with the incident group identifier 120.

In yet further examples, the process 300 may further comprise: receiving, by the mobile public-safety base station 122, via the gateway device 126, from the console device 130 communicatively coupled to the gateway device 126, dispatcher audio; and causing, by the mobile public-safety base station 122, the dispatcher audio to be broadcast to the enterprise radios 104 on the given frequency with the incident group identifier 120. Put another way, a dispatcher may operate the console device 130 to communicate on the talkgroup used by the public-safety radios 124 for the incident, for example to broadcast dispatcher audio to the public-safety radios 124. The gateway device 126 may provide such dispatcher audio to the mobile public-safety base station 122, which may broadcast the dispatcher audio to the enterprise radios 104 on the given frequency with the incident group identifier 120.

In yet further examples, the process 300 may further comprise: patching the mobile public-safety base station 122 with a further mobile public-safety base station, such that respective audio received at the mobile public-safety base station 122 with a further mobile public-safety base station is provided therebetween, the further mobile public-safety base station acting as a bridge between further enterprise radios 104 and further public-safety radios 124. Such functionality may be performed via the PSAP 128 and/or the console device 130, and is described herein with respect to FIG. 9. However, in this example, blocks 302 to 310 of the process 300 may be performed for two sets of digital hubs, enterprise radios, mobile public-safety base stations, gateway devices, and one or more consoles, with audio communications between both sets of enterprise radios, mobile public-safety base stations being shared therebetween.

Figure 7:
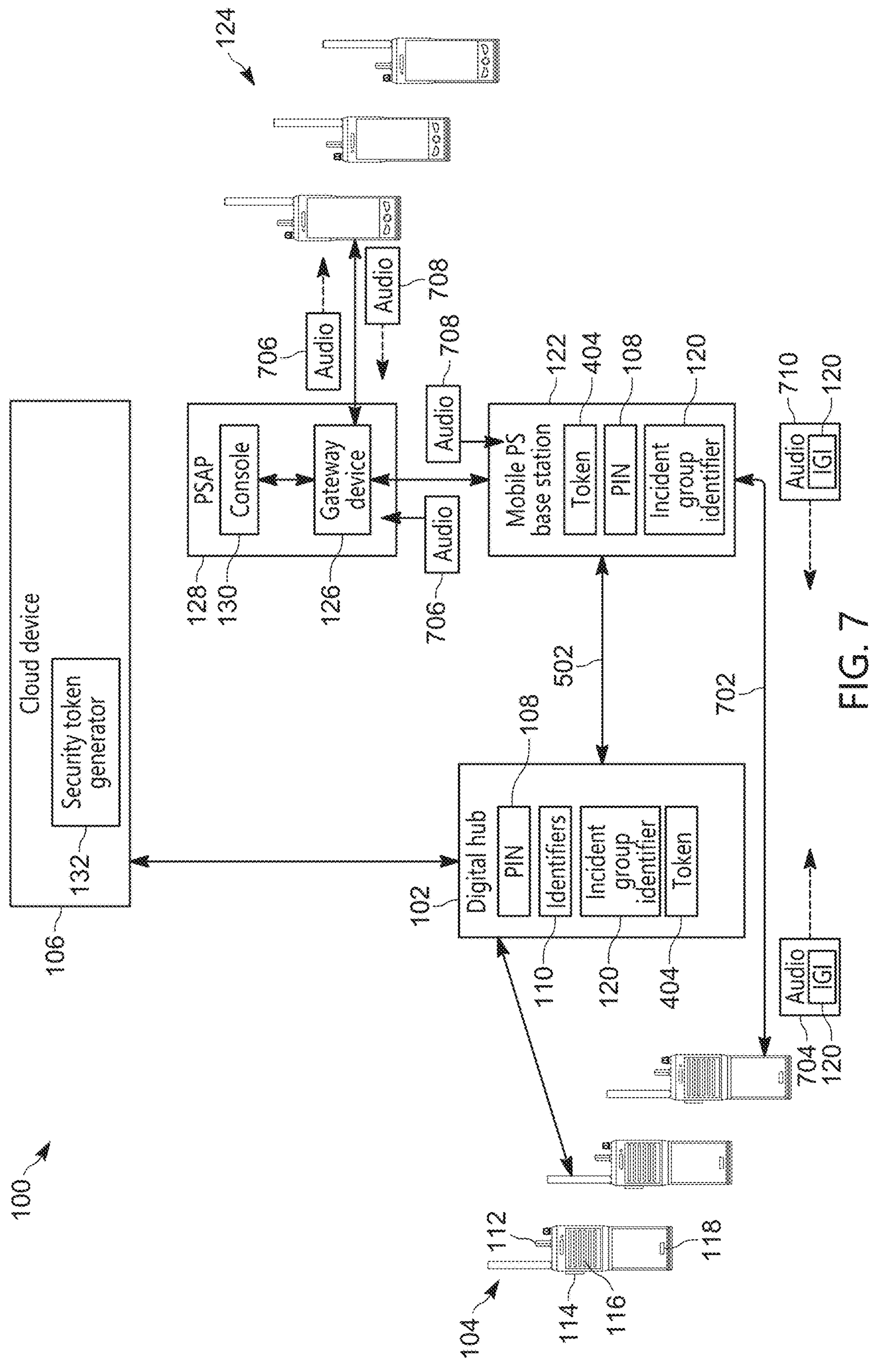
FIG. 7 depicts the system of FIG. 1 continuing to implement a process for bridging communication between enterprise radios and public-safety radios, in accordance with some examples.
Figure 8:
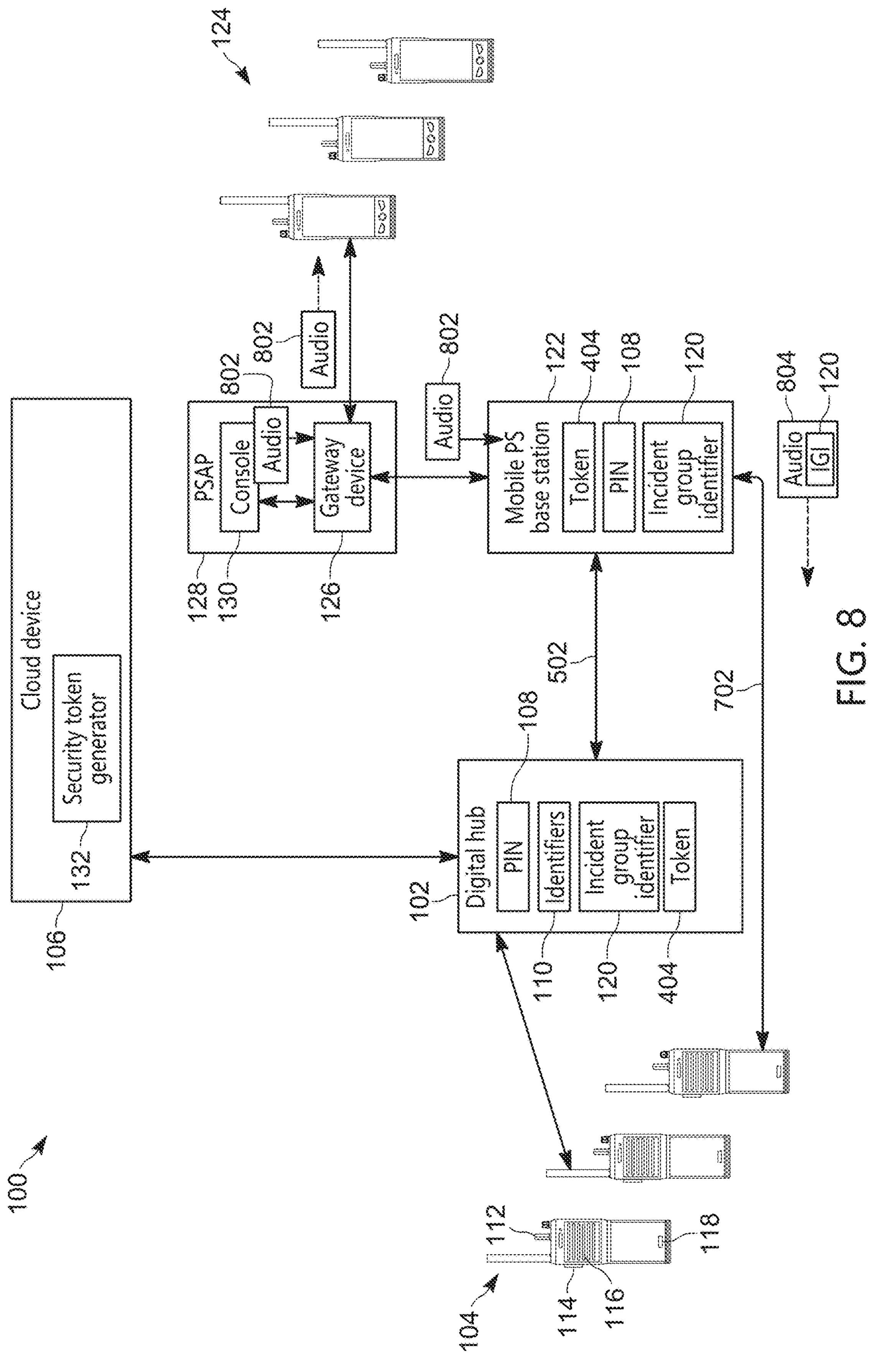
FIG. 8 depicts the system of FIG. 1 continuing to implement a process for bridging communication between enterprise radios and public-safety radios, in accordance with some examples.
Figure 9:
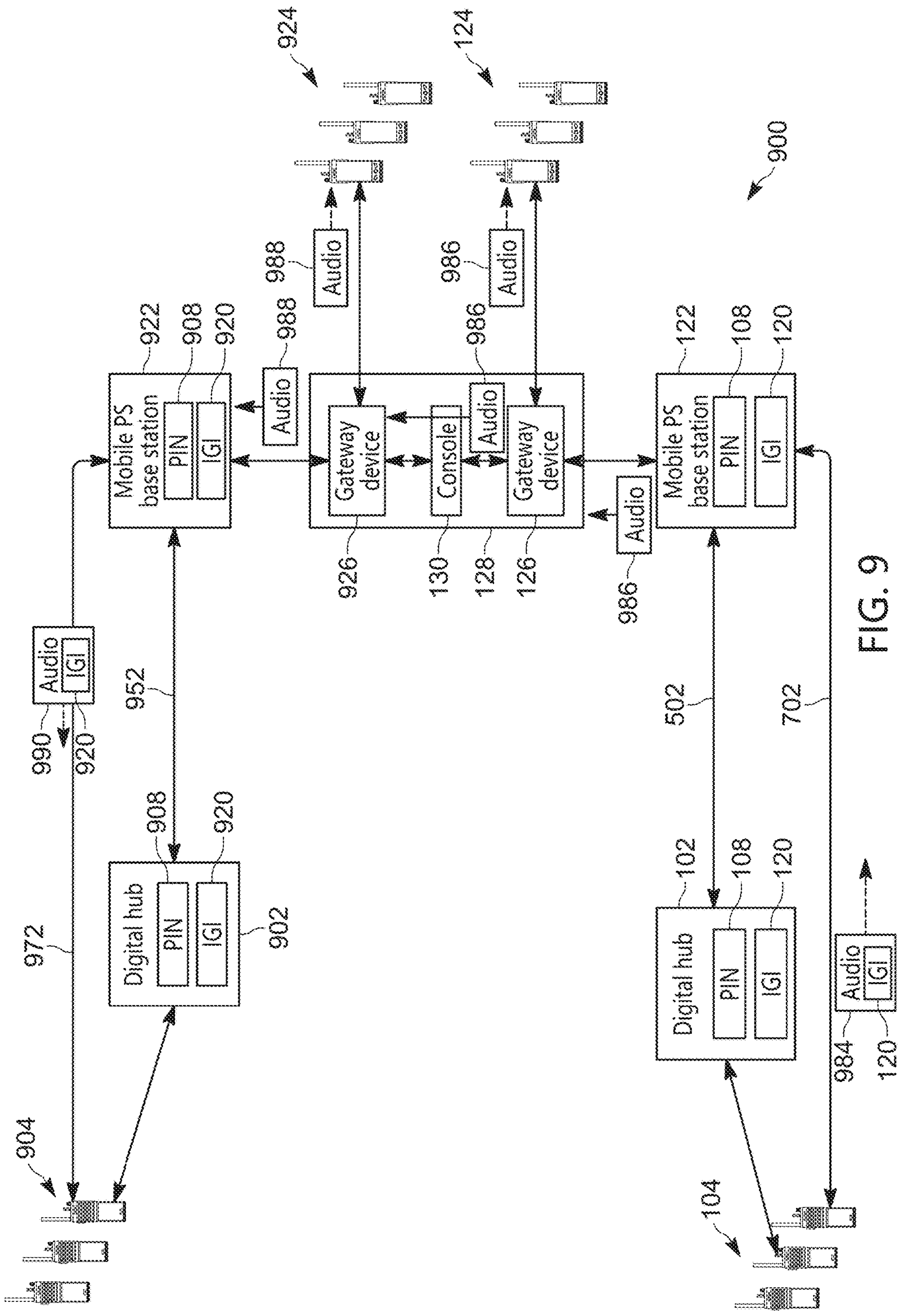
FIG. 9 depicts an alternative to the system of FIG. 1, implementing a process for bridging communication between two sets of enterprise radios and public-safety radios, in accordance with some examples.

Aspects of the process 300 are next described with respect to FIG. 4, FIG. 5, FIG. 6, FIG. 7, FIG. 8, and FIG. 9. FIG. 4, FIG. 5, FIG. 6, FIG. 7, and FIG. 8 are substantially similar to FIG. 1, with like components having like numbers. FIG. 9 depicts an alternative to the system 100 that includes the components of the system 100, as well as further components as described herein.

Furthermore, to distinguish between communication links and data exchanges in FIG. 4, FIG. 5, FIG. 6, FIG. 7, FIG. 8, and FIG. 9 communication links will be depicted using solid lines, as in FIG. 1, and broken lines will be used to show data exchanges.

Figure 4:
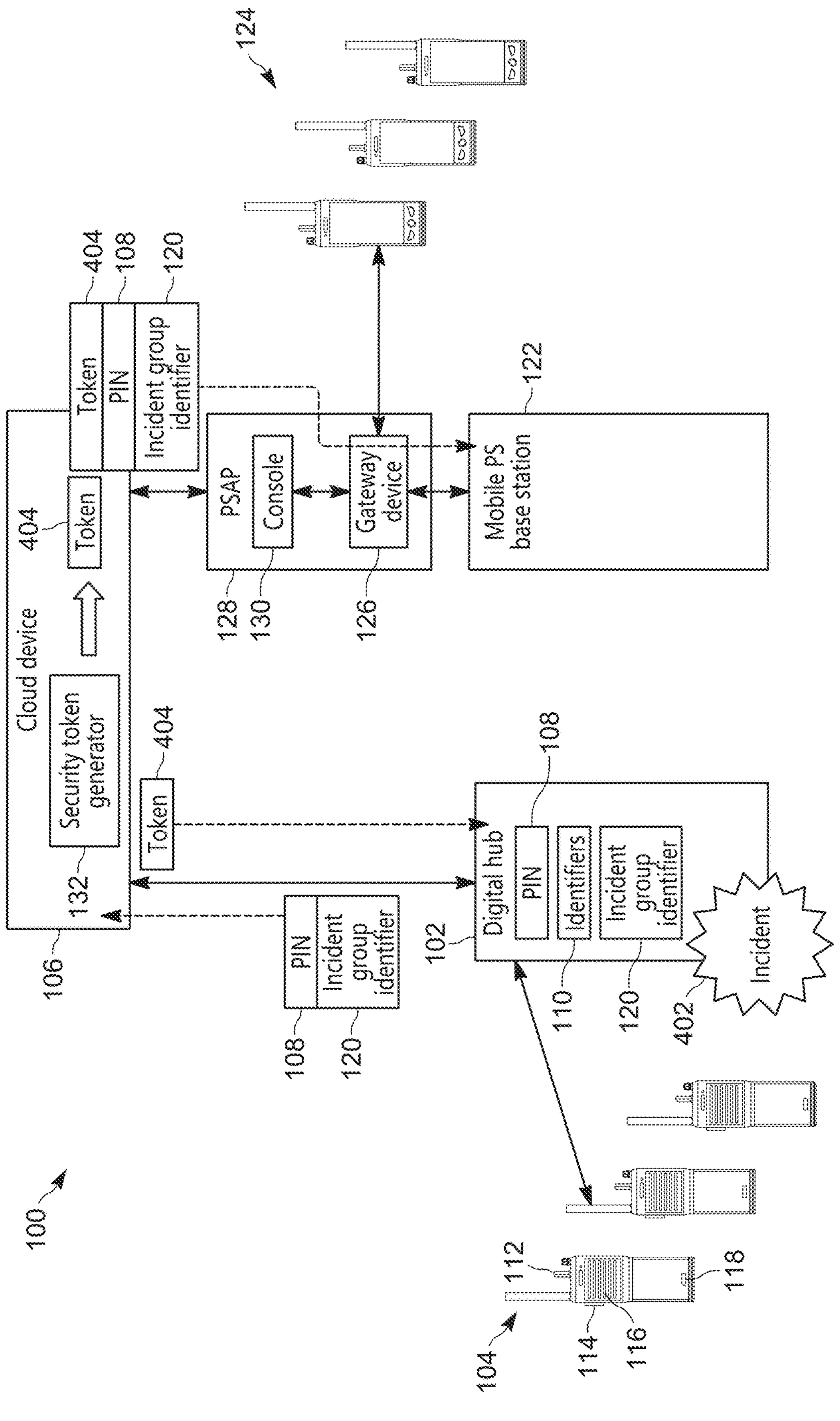
FIG. 4 depicts the system of FIG. 1 implementing a process for bridging communication between enterprise radios and public-safety radios, in accordance with some examples.

Attention is first directed to FIG. 4, which depicts the digital hub 102 determining that an incident has occurred in association with the enterprise radios 104, as represented by a star 402. In response to determining the incident, the digital hub 102, transmits (e.g., at the block 302 of the process 300), to the cloud device 106, the PIN 108 and the incident group identifier 120 (e.g., via the Internet, and the like). In response to receiving the PIN 108 and the incident group identifier 120, the cloud device 106 generates a security token 404 via the security token generator 132, and transmits the security token 404 back to the digital hub 102. In further response to receiving the PIN 108 and the incident group identifier 120, the cloud device 106 transmits the security token 404 (e.g., a copy thereof), the PIN 108 and the incident group identifier 120, to the mobile public-safety base station 122 via the gateway device 126.

It is understood in these examples that the cloud device 106 and/or a component of the PSAP 128 is generally configured to associate the PIN 108 and the incident group identifier 120, as received, with the mobile public-safety base station 122 and the public-safety radios 124. In particular, the incident associated with the enterprise radios 104 may be associated with an incident report, which caused the mobile public-safety base station 122 and the public-safety radios 124 to be dispatched to a location of the enterprise radios 104 and the digital hub 102. The cloud device 106 and/or a component of the PSAP 128 may hence determine that the PIN 108 and the incident group identifier 120 is associated with the mobile public-safety base station 122 and the public-safety radios 124, and transmit the security token 404, the PIN 108 and the incident group identifier 120 to the mobile public-safety base station 122 via the gateway device 126

Figure 5:
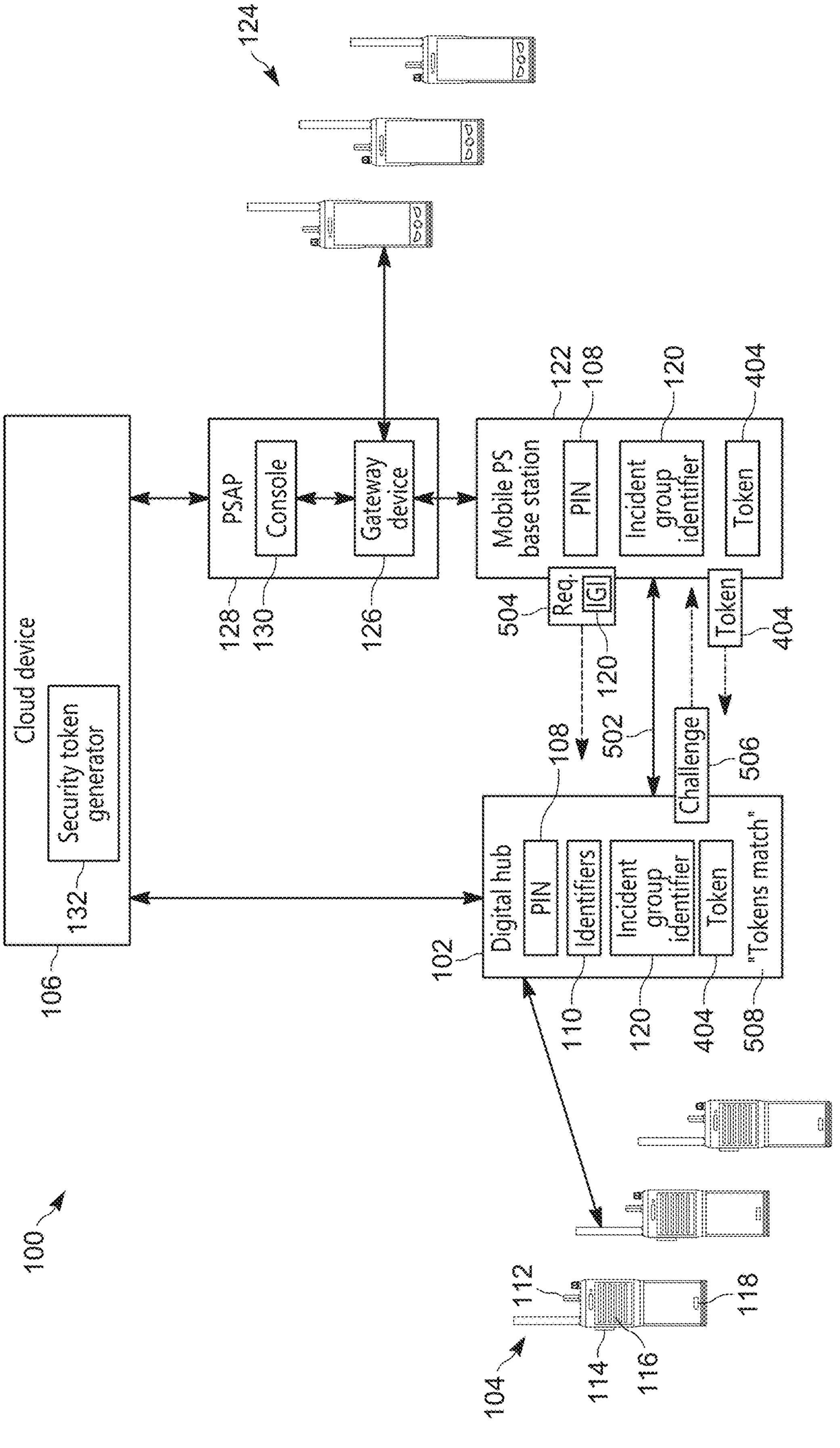
FIG. 5 depicts the system of FIG. 1 continuing to implement a process for bridging communication between enterprise radios and public-safety radios, in accordance with some examples.

Attention is next directed to FIG. 5, which depicts the security token 404 stored at the digital hub 102, and the security token 404, the PIN 108 and the incident group identifier 120 stored at the mobile public-safety base station 122.

In response to receiving the security token 404, the PIN 108 and the incident group identifier 120, the mobile public-safety base station 122 establishes a wireless communication link 502 with the digital hub 102, which generally comprises a wireless communication link on the frequency represented by the PIN 108. The wireless communication link 502 may be established merely by way of the mobile public-safety base station 122 transmitting data on the frequency represented by the PIN 108.

Further, in response to receiving the security token 404, the PIN 108 and the incident group identifier 120, the mobile public-safety base station 122 transmits, to the digital hub 102, a request 504 that includes the incident group identifier 120 (e.g., for simplicity abbreviated to "IGI" at the request 504), which is received (e.g., at the block 304 of the process 300) at the digital hub 102.

In response to receiving the request 504 and the incident group identifier 120 on the communication link 502 (e.g., which may indicate to the digital hub 102 that the mobile public-safety base station 122 has been enabled to communicate with the enterprise radios 104), the digital hub 102 may authenticate (e.g., at the block 306 of the process 300) the mobile public-safety base station 122.

In particular, the digital hub 102 may transmit a token challenge 506 to the mobile public-safety base station 122, and, as depicted, the mobile public-safety base station 122 may respond by transmitting the security token 404 (e.g., a copy thereof), to the digital hub 102. It is understood that the digital hub 102 may compare the security token 404 received from the cloud device 106 with the security token 404 received from the mobile public-safety base station 122 and determine 508 that they match (e.g., as represented by text "Tokens Match" in FIG. 5)

Figure 6:
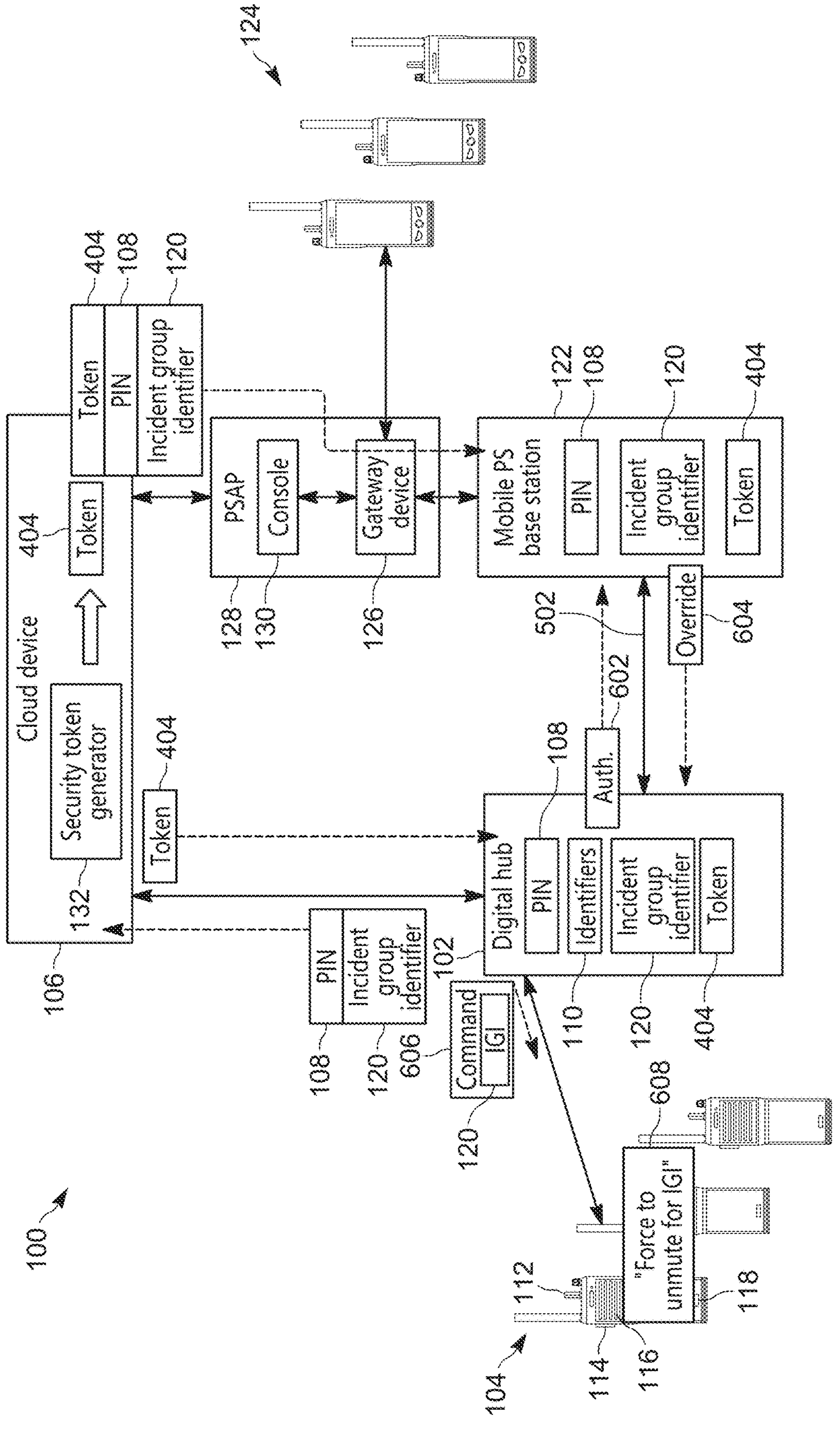
FIG. 6 depicts the system of FIG. 1 continuing to implement a process for bridging communication between enterprise radios and public-safety radios, in accordance with some examples.

As such, and with attention next directed to FIG. 6, the digital hub 102 may authenticate the mobile public-safety base station 122, and responsively transmit an authentication confirmation 602 (e.g., an indication of successful authentication) to the mobile public-safety base station 122, that indicates to the mobile public-safety base station 122 that the digital hub 102 has successfully authenticated the mobile public-safety base station 122.

In response to receiving the authentication confirmation 602, the mobile public-safety base station 122 may transmit an override command 604 to the digital hub 102, which receives the override command 604 (e.g., at the block 308 of the process 300). In general, the override command 604 forces the enterprise radios 104 to communicate via the incident group identifier 120 using the given frequency represented by the PIN 108, for example by way of the digital hub 102 transmitting a corresponding command 606 to the enterprise radios 104 that, as depicted, may include the incident group identifier 120. The commands 604, 606 may have a same format or a different format. For example, the command 604 may be in a format suitable for processing by the digital hub 102 and the command 606 may be in a format suitable for processing by the enterprise radios 104. Furthermore, while not depicted, the command 604 may include the incident group identifier 120 (though including the incident group identifier 120 may be redundant as the incident group identifier 120 was previously transmitted with the request 504).

As further depicted at FIG. 6, the enterprise radios 104 receive the command 606, which forces the enterprise radios 104 into a mode 608 where the enterprise radios 104 unmute their respective speakers 116 when receiving audio that includes the incident group identifier 120, for example regardless of a setting of a respective knob 112. The enterprise radios 104 being forced into the mode 608 is represented by text "FORCE TO UNMUTE FOR IGI" in FIG. 6.

Attention is next directed to FIG. 7, which depicts the system 100 after the command 606 has been processed by the enterprise radios 104.

In particular, the mobile public-safety base station 122 may communicate with the enterprise radios 104 via a wireless communication link 702, which generally comprises a wireless communication link on the frequency represented by the PIN 108. Indeed, the wireless communication links 502, 702 may be established at a same time, and/or may be the same (e.g., and/or may simply represent audio broadcast by the enterprise radios 104, the digital hub 102 and the mobile public-safety base station 122), though the enterprise radios 104 generally ignore any audio received on the wireless communication link 702 until such audio includes the incident group identifier 120 as is next described.

After the authenticating described with respect to FIG. 5 and FIG. 6, the mobile public-safety base station 122 functions as a bridge between the enterprise radios 104 and the public-safety radios 124, such that the mobile public-safety base station 122 converts respective audio from the enterprise radios 104 and the public-safety radios 124 between the given frequency and the second frequency band, and furthermore formats the respective audio so that audio received from the enterprise radios 104 will be played at the public-safety radios 124, and so that audio received from the public-safety radios 124 will be played at the enterprise radios 104 (e.g., and, optionally, received and played at the digital hub 102).

For example, as depicted first audio 704 is transmitted (e.g., broadcast) by an enterprise radio 104 (e.g., upon actuation of a respective button 114), that includes the incident group identifier 120 as metadata, and the first audio 704 is understood to be transmitted by the enterprise radio 104 on the given frequency indicated by the PIN 108, for example over the wireless communication link 702. Put another way, due to receiving the command 606, when a respective button 114 of an enterprise radio 104 is actuated, and a user of the enterprise radio 104 speaks into a respective microphone 118, and the enterprise radio 104 transmits/broadcasts respective audio with the incident group identifier 120, rather than an identifier 110 indicated by a setting of a respective knob 112.

The first audio 704, with the incident group identifier 120, is received by the mobile public-safety base station 122. While not depicted, the first audio 704, with the incident group identifier 120, is also received at the other enterprise radios 104, which unmute their respective speakers 116 and play the first audio 704 as the first audio 704 is received with the incident group identifier 120 (e.g., again regardless of a setting of a respective knob 112).

The mobile public-safety base station 122, however, may strip and/or remove the incident group identifier 120 from the first audio 704 and convert the first audio 704 to audio 706 on a frequency compatible with the public-safety radios 124 on the second frequency band, and furthermore broadcast and/or transmit the converted audio 706 on a talkgroup associated with the incident to the gateway device 126. The gateway device 126 broadcasts the converted audio 706 to the public-safety radios 124 on the second frequency band and/or talkgroup associated with the incident. The public-safety radios 124 are understood to receive the converted audio 706, and play the converted audio 706 on respective speakers.

Similarly, it is understood that audio from the digital hub 102, that includes the incident group identifier 120, may be received at the mobile public-safety base station 122 via the communication link 502 and processed in a similar manner as the first audio 704 so that the that audio from the digital hub 102 is also provided to the public-safety radios 124.

Conversely, as depicted, second audio 708 is transmitted (e.g., broadcast) by a public-safety radio 124 on the second frequency band and/or the talkgroup associated with the incident. The second audio 708 is received by the gateway device 126 and transmitted to the mobile public-safety base station 122 on the second frequency band and/or the talkgroup associated with the incident. While not depicted, the second audio 708 is also received at the other public-safety radios 124 and played.

The mobile public-safety base station 122, however, may convert the second audio 708 to audio 710 on the given frequency represented by the PIN 108, and add the incident group identifier 120 to the converted audio 710 as metadata. The converted audio 710 is broadcast by the mobile public-safety base station 122 on the given frequency represented by the PIN 108 (e.g., represented by the wireless communication link 702). The enterprise radios 104 are understood to receive the converted audio 710, and unmute respective speakers 116 to play the converted audio 710, as the converted audio 710 includes the incident group identifier 120 (e.g., regardless of a setting of a respective knob 112). The converted audio 710 may optionally be received and played at the digital hub 102.

Furthermore, while not depicted, it is understood that the gateway device 126 may provide the audio 706, 708 to the console device 130, where the audio 706, 708 may be played at a respective speaker, and that the console device 130 may be operated to transmit dispatcher audio to the radios 104, 124.

For example, attention is next directed to FIG. 8, which depicts the console device 130 providing dispatch audio 802 to the gateway device 126. For example, an operator of the console device 130 may operate a microphone at the console device 130 to provide the dispatch audio 802 to the gateway device 126, which may broadcast the dispatch audio 802 to the public-safety radios 124 on the second frequency band and/or the talkgroup associated with the incident.

The dispatch audio 802 received by the gateway device 126 is further transmitted to the mobile public-safety base station 122 on the second frequency band and/or the talkgroup associated with the incident.

Similar to the second audio 710, the mobile public-safety base station 122 may convert the dispatch audio 802 to audio 804 on the given frequency represented by the PIN 108, and add the incident group identifier 120 to the converted audio 804 as metadata. The converted audio 804 is broadcast on the given frequency represented by the PIN 108 (e.g., represented by the wireless communication link 702). The enterprise radios 104 are understood to receive the converted audio 804, and unmute respective speakers 116 to play the converted audio 804, as the converted audio 804 includes the incident group identifier 120. The converted audio 804 may optionally be received and played at the digital hub 102.

It is further understood that the process 300 may be performed at a plurality of digital hubs associated with different sets of enterprise radios associated with a same incident and/or related incidents, digital hubs and the different sets of enterprise radios at different locations, and with different mobile public-safety base stations dispatched to the different locations, with different respective sets of public-safety radios in communication with the different mobile public-safety base stations via different gateway devices, and the like.

For example, attention is next direct to FIG. 9, which depicts a system 900 that includes the components of the system 100 (e.g., the system 100 may comprise a subset of the system 900). While not all components of the system 100 are depicted, such as the cloud device 106 and the identifiers 110, they may nonetheless be present at the system 900.

The system 900 further includes a further digital hub 902 and a further set of enterprise radios 904, that may communicate via a further given frequency (e.g., on a 900 MHz frequency band) defined via a respective indication 908 (e.g., a respective PIN 908), and the further given frequency may be different from the given frequency defined by the PIN 108. As depicted, the digital hub 902 stores the PIN 908 and an incident group identifier 920 that may have a similar function, but be same or different from, the incident group identifier 120. While not depicted, the digital hub 902 and the further enterprise radios 904 may further store a list of identifiers similar to the identifiers 110.

It is assumed that the process 300 has been implemented in association with the further digital hub 902 and the further set of enterprise radios 904, and hence a further mobile public-safety base station 922 also stores the PIN 908 and the incident group identifier 920.

The system 900 further comprises the further mobile public-safety base station 922 associated with a further set of public-safety radios 924, and a further gateway device 926 at the PSAP 128 that may communicatively couple the further mobile public-safety base station 922 with the further set public-safety radios 924. The further set of public-safety radios 924 may operate on the same further frequency band as the public-safety radios 124, but on a different talkgroup.

In particular, the further digital hub 902 and the further set of enterprise radios 904 may be associated with a location to which the further mobile public-safety base station 922 and the further set of public-safety radios 924 have been dispatched in association with the same incident associated with the digital hub 102 and the enterprise radios 104. However, it is understood that a location associated with the digital hub 102 and the enterprise radios 104 is different from a location associated with the further digital hub 902 and the further set of enterprise radios 904.

It is understood in the system 900 that the process 300 has been implemented in association with the further digital hub 902, the further set of enterprise radios 904, the further mobile public-safety base station 922 and the further set of public-safety radios 924. As such, the further mobile public-safety base station 922 functions as a bridge between the further set enterprise radios 904 and the further set of public-safety radios 924, such that the further mobile public-safety base station 922 converts respective audio from the further set enterprise radios 904 and the further set of public-safety radios 924 between the further given frequency and the further frequency band (but on a different respective talkgroup than the public-safety radios 124).

As such, the further mobile public-safety base station 922 has established communication links 952, 972 with the further digital hub 902 and the further set of enterprise radios 904, and is converting audio between the further set enterprise radios 904 and the further set of public-safety radios 924 as described with respect to FIG. 7, via the further gateway device 926.

Furthermore, as depicted, the mobile public-safety base station 122 and the further mobile public-safety base station 922 may be patched together, such that respective audio received at the mobile public-safety base station 122 and the further mobile public-safety base station 922 is provided therebetween, the further mobile public-safety base station 922 acting as a bridge between further the enterprise radios 904 and the further public-safety radios 924.

As depicted, the patching may occur via the gateway devices 126, 926 and the console device 130 and/or via any other suitable components of the PSAP 128. For example, the console device 130 may be operated to patch together the gateway devices 126, 926 via any suitable set of commands. In such examples, respective audio received at a gateway device 126, 926 may be provided to the other gateway device 126, 926, which may provide the respective audio to a respective mobile public-safety base stations 122, 922, which converts the respective audio as described with respect to FIG. 7 to respective frequencies defined by the respective PINs 108, 908, and includes, in the respective audio, the respective incident group identifiers 120, 920. The gateway devices 126, 926 further provide audio received to respective public-safety radios 124, 924.

For example, as depicted audio 984 is transmitted (e.g., broadcast) by an enterprise radio 104, that includes the incident group identifier 120 as metadata, and the audio 984 is understood to be transmitted by the enterprise radio 104 on the given frequency indicated by the indication 108, for example over the wireless communication link 702. The audio 984, with the incident group identifier 120 is received by the mobile public-safety base station 122. While not depicted, the audio 984, with the incident group identifier 120, is also received at the other enterprise radios 104, which unmute their respective speakers 116 and play the audio 984 as the audio 984 is received with the incident group identifier 120.

The mobile public-safety base station 122, however, may strip and/or remove the incident group identifier 120 from the audio 984 and convert the audio 984 to audio 986 on a frequency compatible with the public-safety radios 924 on the second frequency band, and furthermore provide the converted audio 984 on a talkgroup associated with the incident to the gateway device 126. The gateway device 126 may broadcast the converted audio 986 to the public-safety radios 124 on the second frequency band and/or talkgroup. The public-safety radios 124 are understood to receive the converted audio 986, and play the converted audio 986 on respective speakers.

Furthermore, as depicted, the converted audio 986 is provided from the gateway device 126 to the further gateway device 926 (e.g., via the console device 130 where the converted audio 984 may also be played), and optionally converted to audio 988 (e.g., on the second frequency band and/or talkgroup particular to the further public-safety radios 924), and the converted audio 988 (e.g., or the original converted audio 986) may be broadcast, via the further gateway device 926, to the further public-safety radios 924 on the second frequency band and/or talkgroup particular to the further public-safety radios 924, which play the converted audio 988.

However, also as depicted, the converted audio 988 (e.g., or the original converted audio 986) is transmitted by the further gateway device 926 to the further mobile public-safety base station 922 (e.g., on a talkgroup used to transmit the converted audio 988 to the further public-safety radios 924).

The further mobile public-safety base station 922, however, may convert the second audio 988 to audio 990 on the given frequency represented by the PIN 908, and add the incident group identifier 920 to the converted audio 990 as metadata. The converted audio 990 is broadcast on the given frequency represented by the PIN 908 (e.g., represented by the wireless communication link 972). The further enterprise radios 904 are understood to receive the converted audio 990, and unmute respective speakers to play the converted audio 990, as the converted audio 990 includes the incident group identifier 920. The converted audio 990 may optionally be received and played at the further digital hub 902.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, transmit audio electronically, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:

in response to determining, via a digital hub, that an incident has occurred in association with enterprise radios operating within a first frequency band, transmitting, via the digital hub, to a cloud device: an incident group identifier that causes the enterprise radios to unmute when received; and an indication of a given frequency in the first frequency band for use in communicating with the enterprise radios and the digital hub;

receiving, via the digital hub, from a mobile public-safety base station on the given frequency, a request to communicate with the enterprise radios, the request including the incident group identifier, the mobile public-safety base station communicatively coupled with the cloud device and public-safety radios operating within a second frequency band;

authenticating, via the digital hub, the mobile public-safety base station using a security token;

in response to the authenticating, receiving, via the digital hub, from the mobile public-safety base station, an override command that forces the enterprise radios to communicate via the incident group identifier using the given frequency; and in response to receiving the override command, transmitting, via the digital hub, to the enterprise radios, a command that forces the enterprise radios to communicate with public-safety radios, via the mobile public-safety base station, using the incident group identifier.

2. The method of claim 1, wherein, after the authenticating, the mobile public-safety base station functions as a bridge between the enterprise radios and the public-safety radios, such that the mobile public-safety base station converts respective audio from the enterprise radios and the public-safety radios between the given frequency and the second frequency band.

3. The method of claim 1, wherein, after the authenticating:

first audio from the enterprise radios, received at the mobile public-safety base station on the given frequency, is transmitted, by the mobile public-safety base station, to the public-safety radios on a respective frequency in the second frequency band; and second audio from the public-safety radios received at the mobile public-safety base station is transmitted, by the mobile public-safety base station, to the enterprise radios on the given frequency with the incident group identifier.

4. The method of claim 1, wherein the mobile public-safety base station is in communication with the public-safety radios via a gateway device.

5. The method of claim 1, further comprising:

receiving, by the mobile public-safety base station, from one of the enterprise radios, first audio on the given frequency with the incident group identifier; and causing, by the mobile public-safety base station, the first audio to be broadcast, via a gateway device, to the public-safety radios on the second frequency band.

6. The method of claim 1, further comprising:

receiving, by the mobile public-safety base station, via a gateway device, from one of the public-safety radios, second audio; and causing, by the mobile public-safety base station, the second audio to be broadcast to the enterprise radios on the given frequency with the incident group identifier.

7. The method of claim 1, further comprising:

receiving, by the mobile public-safety base station, via a gateway device, from a console device communicatively coupled to the gateway device, dispatcher audio; and causing, by the mobile public-safety base station, the dispatcher audio to be broadcast to the enterprise radios on the given frequency with the incident group identifier.

8. The method of claim 1, further comprising:

patching the mobile public-safety base station with a further mobile public-safety base station, such that respective audio received at the mobile public-safety base station and the further mobile public-safety base station is provided therebetween, the further mobile public-safety base station acting as a bridge between further enterprise radios and further public-safety radios.

9. The method of claim 1, wherein the authenticating, via the digital hub, the mobile public-safety base station using the security token comprises:

determining, via the digital hub, the security token;

transmitting, via the digital hub, to the mobile public-safety base station, a token challenge;

in response to the token challenge, receiving, via the digital hub, from the mobile public-safety base station, a respective security token; and authenticating, via the digital hub, the mobile public-safety base station when the security token and the respective security token are same or associated.

10. The method of claim 9, wherein determining, via the digital hub, the security token comprises one of:

receiving, via the digital hub, from the cloud device, the security token; or generating, via the digital hub, the security token; and providing a copy of the security token to the cloud device, wherein the cloud device provides the copy of the security token to the mobile public-safety base station as the respective security token.

11. A digital hub comprising:

a controller; and a computer-readable storage medium having stored thereon program instructions that, when executed by the controller, causes the controller to perform a set of operations comprising:

in response to determining that an incident has occurred in association with enterprise radios operating within a first frequency band, transmitting, to a cloud device: an incident group identifier that causes the enterprise radios to unmute when received; and an indication of a given frequency in the first frequency band for use in communicating with the enterprise radios and the digital hub;

receiving, from a mobile public-safety base station on the given frequency, a request to communicate with the enterprise radios, the request including the incident group identifier, the mobile public-safety base station communicatively coupled with the cloud device and public-safety radios operating within a second frequency band;

authenticating the mobile public-safety base station using a security token;

in response to the authenticating, receiving, from the mobile public-safety base station, an override command that forces the enterprise radios to communicate via the incident group identifier using the given frequency; and in response to receiving the override command, transmitting, to the enterprise radios, a command that forces the enterprise radios to communicate with public-safety radios, via the mobile public-safety base station, using the incident group identifier.

12. The digital hub of claim 11, wherein, after the authenticating, the mobile public-safety base station functions as a bridge between the enterprise radios and the public-safety radios, such that the mobile public-safety base station converts respective audio from the enterprise radios and the public-safety radios between the given frequency and the second frequency band.

13. The digital hub of claim 11, wherein, after the authenticating:

first audio from the enterprise radios, received at the mobile public-safety base station on the given frequency, is transmitted, by the mobile public-safety base station, to the public-safety radios on a respective frequency in the second frequency band; and second audio from the public-safety radios received at the mobile public-safety base station is transmitted, by the mobile public-safety base station, to the enterprise radios on the given frequency with the incident group identifier.

14. The digital hub of claim 11, wherein the mobile public-safety base station is in communication with the public-safety radios via a gateway device.

15. The digital hub of claim 11, wherein the authenticating the mobile public-safety base station using the security token comprises:

determining the security token;

transmitting to the mobile public-safety base station, a token challenge;

in response to the token challenge, receiving, from the mobile public-safety base station, a respective security token; and authenticating the mobile public-safety base station when the security token and the respective security token are same or associated.

16. The digital hub of claim 15, wherein determining the security token comprises:

receiving from the cloud device, the security token.

17. The digital hub of claim 15, wherein determining the security token comprises:

generating the security token; and providing a copy of the security token to the cloud device, wherein the cloud device provides the copy of the security token to the mobile public-safety base station as the respective security token.

18. A system comprising:

enterprise radios operating within a first frequency band;

public-safety radios operating within a second frequency band;

a digital hub associated with the enterprise radios;

a mobile public-safety base station associated with the public-safety radios;

a gateway device communicatively coupled to the public-safety radios;

a cloud device communicatively coupled to: the digital hub; and the mobile public-safety base station via the gateway device;

wherein the digital hub is configured to:

in response to determining that an incident has occurred in association with the enterprise radios, transmit, to the cloud device, an incident group identifier that causes the enterprise radios to unmute when received; and an indication of a given frequency in the first frequency band for use in communicating with the enterprise radios and the digital hub, wherein the cloud device provides the incident group identifier and the indication of the given frequency to the mobile public-safety base station via the gateway device;

receive, from the cloud device, a security token, the cloud device also providing the security token to the mobile public-safety base station via the gateway device;

receive, from the mobile public-safety base station on the given frequency, a request to communicate with the enterprise radios, the request including the incident group identifier;

authenticate the mobile public-safety base station using the security token;

in response to the authenticating, receive from the mobile public-safety base station, an override command that forces the enterprise radios to communicate via the incident group identifier using the given frequency; and in response to receiving the override command, transmit, to the enterprise radios, a command that forces the enterprise radios to communicate with public-safety radios, via the mobile public-safety base station, using the incident group identifier; and wherein the mobile public-safety base station is configured to:

after the authenticating, function as a bridge between the enterprise radios and the public-safety radios, such that the mobile public-safety base station converts respective audio from the enterprise radios and the public-safety radios between the given frequency and the second frequency band.

19. The system of claim 18, wherein the digital hub is further configured to:

receive, from one of the enterprise radios, first audio on the given frequency with the incident group identifier; and cause the first audio to be broadcast, via the gateway device, to the public-safety radios on the second frequency band; and receive, via the gateway device, from one of the public-safety radios, second audio; and cause the second audio to be broadcast to the enterprise radios on the given frequency with the incident group identifier.

20. The system of claim 18, wherein the digital hub is further configured to:

receive, via the gateway device, from a console device communicatively coupled to the gateway device, dispatcher audio; and cause the dispatcher audio to be broadcast to the enterprise radios on the given frequency with the incident group identifier.

* * * * *